United States Patent
Yu et al.

(10) Patent No.: US 9,158,792 B2
(45) Date of Patent: Oct. 13, 2015

(54) APPARATUS AND METHOD FOR AUTOMATICALLY COMPOSING ALBUM AND MANAGING COVER IMAGE OF ALBUM

(75) Inventors: Seung-hyuk Yu, Seoul (KR); Chang-nam Chu, Yongin-si (KR); Chun-un Kang, Seoul (KR); Dae-hyun Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 672 days.

(21) Appl. No.: 11/843,205

(22) Filed: Aug. 22, 2007

(65) Prior Publication Data

US 2008/0154962 A1    Jun. 26, 2008

(30) Foreign Application Priority Data

Dec. 22, 2006 (KR) ................. 2006-132981

(51) Int. Cl.
| | |
|---|---|
| G06F 7/00 | (2006.01) |
| G06F 17/30 | (2006.01) |
| G06Q 10/00 | (2012.01) |
| G06Q 30/06 | (2012.01) |
| G11B 27/034 | (2006.01) |
| G11B 27/10 | (2006.01) |
| G11B 27/30 | (2006.01) |

(52) U.S. Cl.
CPC ............ *G06F 17/3028* (2013.01); *G06Q 10/00* (2013.01); *G06Q 30/06* (2013.01); *G11B 27/034* (2013.01); *G11B 27/105* (2013.01); *G11B 27/3027* (2013.01)

(58) Field of Classification Search
USPC .................. 707/828, 821, 822, 796, 736, 758
See application file for complete search history.

(56) References Cited

U.S. PATENT DOCUMENTS

| | | | |
|---|---|---|---|
| 8,055,362 B2 | 11/2011 | Yamada | |
| 2003/0182139 A1* | 9/2003 | Harris et al. | 705/1 |
| 2005/0086265 A1 | 4/2005 | Sato | |
| 2005/0207430 A1 | 9/2005 | Yamada | |
| 2006/0224620 A1* | 10/2006 | Silverman et al. | 707/104.1 |
| 2006/0230331 A1* | 10/2006 | Abanami et al. | 715/500 |
| 2007/0083471 A1* | 4/2007 | Robbin et al. | 705/51 |
| 2007/0233740 A1* | 10/2007 | Nichols et al. | 707/104.1 |
| 2007/0299806 A1* | 12/2007 | Bardsley et al. | 707/1 |
| 2008/0147726 A1* | 6/2008 | Hwang et al. | 707/104.1 |

FOREIGN PATENT DOCUMENTS

| | | |
|---|---|---|
| CN | 1673977 A | 9/2005 |
| JP | 2002-108359 | 4/2002 |
| JP | 2005-044403 | 2/2005 |

(Continued)

OTHER PUBLICATIONS

Crank Up the Tunes, Jan. 4, 2006, Apple Support, papes 1-9.*

(Continued)

*Primary Examiner* — Hexing Liu
(74) *Attorney, Agent, or Firm* — Jefferson IP Law, LLP

(57) ABSTRACT

An apparatus for automatically configuring an album includes an album-creating unit to create an album by using a folder name when at least one folder having the folder name is moved to a selected area, a cover-image-registering unit to register a cover image of the album created by the album-creating unit, and a content-registering unit to register content included in the folder to the album.

26 Claims, 9 Drawing Sheets

(56) References Cited

FOREIGN PATENT DOCUMENTS

| | | |
|---|---|---|
| KR | 2005-37970 | 4/2005 |
| KR | 2005-52607 | 6/2005 |

OTHER PUBLICATIONS

Using digiKim, "Chapter 2. Using digiKam," http://web.archive.org/web/20060205053910/http://docs.kde.org/development/en/extragear-graphics/digikam/using-kapp.html, Feb. 5, 2006, pp. 1-12.*

* cited by examiner

APPARATUS AND METHOD FOR AUTOMATICALLY COMPOSING ALBUM AND MANAGING COVER IMAGE OF ALBUM

CROSS-REFERENCE TO RELATED APPLICATION

This application claims the benefit of Korean Application No. 2006-132981, filed Dec. 22, 2006 in the Korean Intellectual Property Office, the disclosure of which is incorporated herein by reference.

BACKGROUND OF THE INVENTION

1. Field of the Invention

Aspects of the present invention relate to an apparatus and method to automatically configure an album and manage a cover image of the album, and more particularly, to an apparatus and method to automatically configure an album and manage a cover image of the album which easily and automatically configure a plurality of albums in response to a user command and conveniently manage a cover image of an album.

2. Description of the Related Art

With the development of mobile technologies, the number of people who use mobile devices, such as MP3 players, digital cameras, portable media players (PMPs), and mobile phones is sharply increasing. A user records multimedia content, (hereinafter, referred to as content), such as, for example, images, audio files, and video files, to the mobile device in various ways, such as by using a camera on a mobile phone or by downloading a song from the Internet. The user then manages the recorded content to perform various functions with the content, such as viewing an image taken with the camera or listening to the song downloaded from the Internet.

FIG. 1 is a flowchart showing a conventional method of managing content by creating an album which includes the content. First, at operation S11, a user inputs an "add album" command to a device, such as an MP3 player, which has the content recorded therein, in order to create an album to manage the content. At operation S21, the user inputs a name and a description of the album into the device.

Then, at operation S31, the user searches for images to be registered as a cover image of the album, and selects an image from the images found by the searching as a cover image. Also, if the user is creating a plurality of albums and there is an insufficient number of sample images to register as cover images of albums for each of the plurality of albums, the user may choose to omit the operation of creating albums with cover images, or may search for and register a predetermined image to be assigned to the extra albums which do not have corresponding sample images.

At operation S41, the user registers the selected image as a cover image of an album. Then, at operation S51, the user selects content (such as, for example, media files including music, video files, and photos) to include in the album, and registers the content to the album.

However, if a user uses the conventional method shown in FIG. 1 and described above, when a cover image of an album is not registered, the user may have difficulty efficiently managing a plurality of albums. Also, since a user has to perform each of the operations S11, S21, S31, S41, and S51 whenever a new album is created, it is inefficient for a user to create cover images for a plurality of albums.

SUMMARY OF THE INVENTION

In view of the above and/or other problems, an aspect of the present invention provides an album-configuring apparatus and method which enable a user to automatically create an album, and which further enable a user to register a cover image of the album and content included in the album by performing a simple operation on a folder which includes the content.

According to an aspect of the present invention, an auto-album-configuring apparatus includes an album-creating unit to create an album by using a folder name when at least one folder having the folder name is moved to a selected area, a cover-image-registering unit to register a cover image of the album created by the album-creating unit, and a content-registering unit to register content included in the folder to the album.

According to another aspect of the present invention, a cover-image-managing apparatus includes an analyzing unit to analyze content registered in an album at least one of information on use frequency, genre, or mood, an extracting unit to extract at least one image to be used as a cover image of the album, based on the analyzed content, a display unit to display the at least one extracted image on a screen, and a registering unit to register an image selected by a user among the at least one extracted images as the cover image of the album.

According to still another aspect of the present invention, an auto-album-configuring method includes creating an album by using a folder name of a folder when the folder is moved to a selected area, registering a cover image of an album corresponding to the folder, and registering content included in the folder to the album.

According to another aspect of the present invention, a cover-image-managing method includes analyzing content registered in an album for at least one of information on use frequency, genre, or mood, extracting at least one image to be used as a cover image of the album based on the analyzed content, displaying the at least one extracted image on a screen, and registering an image selected by a user among the at least one extracted image as the cover image of the album.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
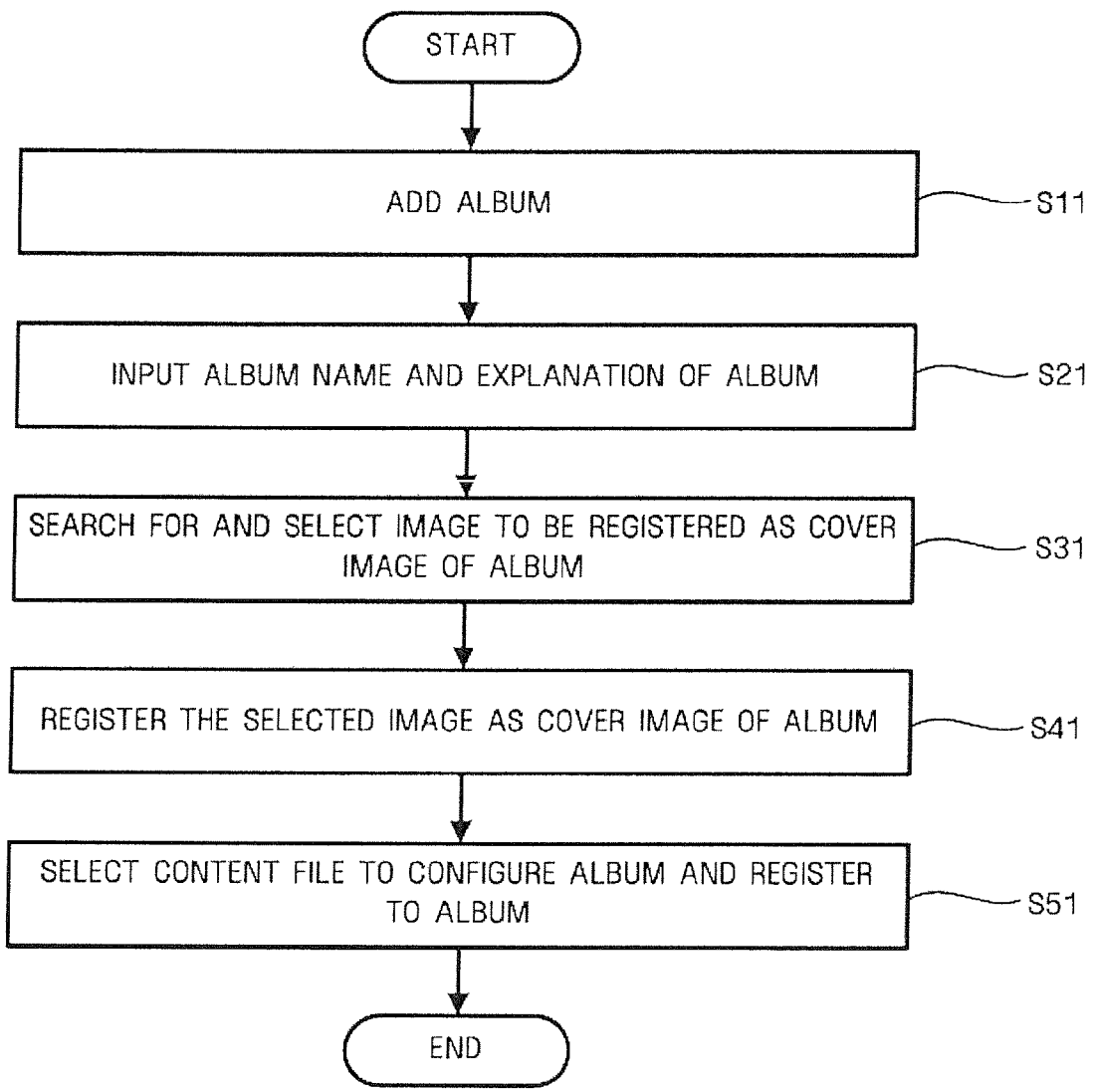
FIG. 1 is a flowchart showing a conventional method of managing content by creating an album which includes the content.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
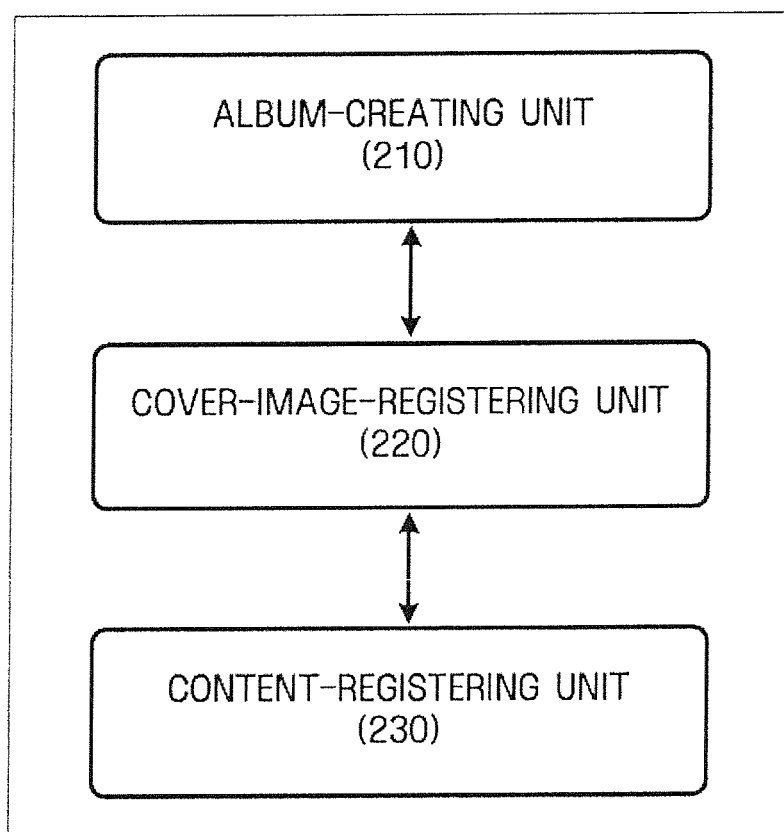
FIG. 2 is a block diagram showing an auto-album-configuring apparatus according to an embodiment of the present invention.

FIG. 2 is a block diagram showing an auto-album-configuring apparatus 200 according to an embodiment of the present invention. The auto-album configuring apparatus 200 includes an album-creating unit 210, a cover-image-registering unit 220, and a content-registering unit 230.

When a user moves a folder 712 (FIG. 7) including content 920 (FIG. 9), such as, for example, images, video files, and/or audio files, to a selected area 720 on a screen 700 (FIG. 7), such as a screen on an MP3 player, the album-creating unit 210 creates an album 910 (FIG. 9) by using the folder name. If the folder 712 contains sub-folders, the album-creating unit 210 creates a corresponding additional album 910 for each sub-folder. The album 910 is a storage space in which content 920 (such as, for example, multimedia content) is included, or recorded. One way in which a user can move the folder 712 around the screen is by using a mouse to drag and drop the folder 712 into a selected area 720. Alternatively, the user can move the folder 712 to create an album 910 by selecting several folders 712 and clicking on a predetermined movement button, such as an arrow key, to highlight and select the desired folder 712. Accordingly, aspects of the present invention enable a user to automatically create an album 910 by using a folder name, without additionally registering an album name 722. It is understood that a user may use other devices to move the folder 712 around the screen, such as, for example, a touch screen, etc.

Figure 3:
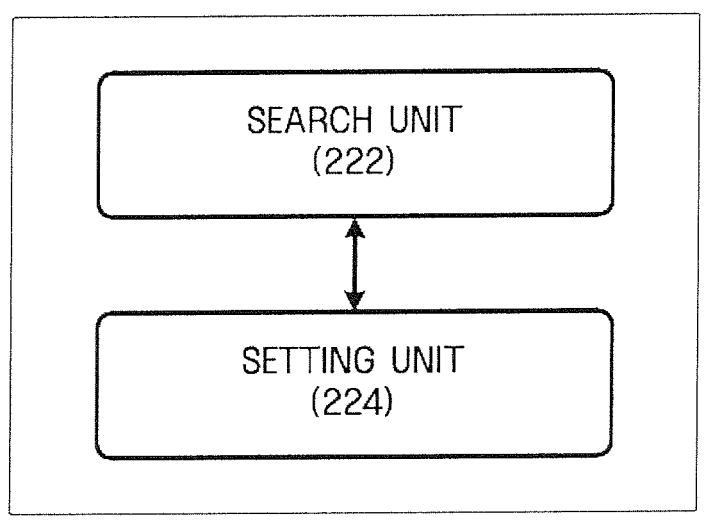
FIG. 3 a block diagram showing a cover-image-registering unit according to an embodiment of the present invention.

After the folder 712 is moved to the selected area 720, the cover-image-registering unit 220 registers a cover image 724 of the album 910. FIG. 3 is a block diagram showing the cover-image-registering unit 220 according to an embodiment of the present invention. As shown in FIG. 3, the cover-image-registering unit 220 includes a search unit 222 and a setting unit 224. If the folder 712 includes sub-folders, the cover-image-registering unit 220 registers additional cover images 724 corresponding to the sub-folders.

The search unit 222 searches for an image to be used as a cover image 724 of the album 910. Further, the search unit 222 extracts an image to be used as the cover image 724 (FIG. 7) of a created album 910 by searching for content 920 in the folder 712. As the search unit 222 searches the content 920 in the folder 712, the search unit 222 extracts an image to be used as a cover image 724 of the album 910 by using the folder 712 (or album) name as a keyword. For example, the search unit 222 may extract an image having the corresponding folder name as a cover image 724 of the album 910 by searching for metadata of an image corresponding to the folder name. If the search unit 222 finds several images having metadata corresponding to the folder name, the search unit 222 extracts one of the several images to be used as a cover image 724 of the album 910 by considering various predetermined factors, such as, for example, the order in which the search unit 222 finds the images, frequencies of use of the images, or file sizes of the images.

If a searching route is set via a setting unit 224, the search unit 222 searches for the image to be used as the cover image 724 of the album 910 by searching along the set searching route. If the setting unit 224 has not set a searching route, the search unit 222 initially searches for an image in a folder 712 corresponding to the created album 910 by searching, for example, metadata in the folder 712 for a keyword. Then, if the folder 712 corresponding to the created album 910 does not include any images matching the metadata keyword, the search unit 222 searches the Internet for an image. Thus, if the search unit 222 finds an image to be used as a cover image 724 of the album 910 in the folder 712, the search unit 222 registers the image as a cover image 724 of the album 910 via the cover-image-registering unit 220. However, if the search unit 222 does not find an image in the folder 712, the search unit 222 searches the Internet for an image. If a user has designated an Internet web site, the search unit 222 searches the designated Internet web site for an image. When the search unit 222 finds an image matching the keyword, the cover-image-registering unit 220 registers the image as a cover image 724 of the album 910. It is understood that the search unit 222 is not limited to searching folders 712 and the Internet, and may instead search other computer networks, LANs, and any other type of file, database, or storage medium searchable by computers.

The setting unit 224 sets a searching route to be used by the search unit 222. For example, the search unit 222 searches a web site or a series of web sites on the Internet or a predetermined folder 712 according to the set search route. A user may additionally set the designated Internet web site or a series of designated web sites to be searched via the setting unit 224 in order to efficiently search for the image. After the image is found, the content-registering unit 230 registers content 920 included in the folder 712 to the album 910. If the folder 712 includes sub-folders, the content-registering unit 220 registers additional content 920 corresponding to the sub-folders.

Figure 4:
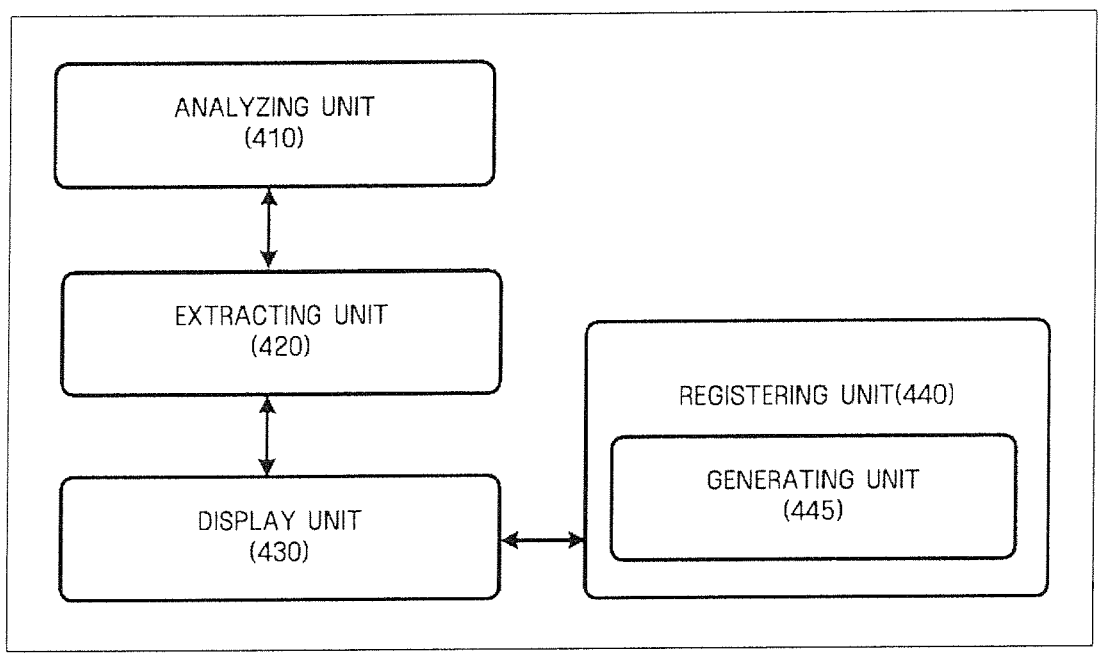
FIG. 4 is a block diagram showing a cover-image-managing apparatus of an album according to an embodiment of the present invention.

FIG. 4 is a block diagram showing a cover-image-managing apparatus 400 of an album 910 according to an embodiment of the present invention. A cover-image-managing apparatus 400 includes an analyzing unit 410, an extracting unit 420, a display unit 430, and a registering unit 440.

After the album-creating unit 210 creates the album 910, the analyzing unit 410 analyzes at least one of a frequency of use, genre, or mood of the content 920 included in the album 910 (i.e., the content 920 included in the folder 712 corresponding to the album 910). It is understood that when the analyzing unit 410 analyzes at least one of frequency of use, genre, or mood, the analyzing unit 410 may analyze only one of frequency of use, genre, or mood, or may analyze a combination of these characteristics. When the analyzing unit 410 measures a frequency of use of the content 920 registered in the album 910, the analyzing unit 410 counts the number of times that a user plays a video file or audio file, or a number of times a user views an image. Furthermore, when the analyzing unit 410 analyzes genre, the analyzing unit 410 measures the ratio of each genre in the album 910 by analyzing the genres of the content 920 included in the album 910. For example, the analyzing unit 410 analyzes metadata of music files included in the album 910 in order to measure the ratio of each genre associated with the music files, such as classical, jazz, and pop music. Additionally, when the analyzing unit 410 analyzes mood, the analyzing unit 410 measures the ratio of mood in the album 910 by analyzing the moods of the content 920 included in the album 910. For example, the analyzing unit 410 analyzes metadata of the content 920 in order to measure a ratio of each mood associated with the music files in the album 910, such as happiness, sadness, and anger. It is understood that the analyzing unit 410 is not limited to analyzing frequency of use, genre, and mood of the content 920 included in the album 910, and may also analyze any sort of information and/or characteristics associated with the content 920 included in the album 910, such as, for example, artist information, etc. Further, the analyzing unit 410 may analyze combinations of factors, for example, a frequency of use of songs included within a certain type of genre.

The extracting unit 420 extracts the image to be used as the cover image 724 of the album 910 based on the information analyzed by the analyzing unit 410. When a user clicks a cover image 724 of the album 910, the extracting unit 420 extracts the image most frequently used among the images registered in the album 910. The extracting unit 420 also may extract a predetermined image according to a genre or mood that has the highest ratio measured by the analyzing unit 410. The extracted image may be a predetermined sample image included in the folder 712, or an image taken from an external source, such as the Internet. Additionally, the extracting unit 420 may extract a plurality of images.

The display unit 430 displays the extracted images on a screen, such as an LCD screen on an MP3 player. When the extracting unit 420 extracts multiple images, the display unit 430 displays the extracted image in a predetermined form around the cover image 724 of the album 910.

When the display unit 430 displays multiple images, the registering unit 440 registers the image selected by a user from among the displayed images as a cover image 724 of the album 910. When a user controls a computer mouse to drag and drop the selected image to the cover image 724 of the album 910, the registering unit 440 registers the corresponding image as the cover image 724 of the album 910. Furthermore, if a user wants to select a predetermined scene from a video file as the cover image 724, the user first captures the predetermined scene and generates the image, and then controls the computer mouse to move the generated image over the cover image 724 of the album 910. At this point, the registering unit 440 automatically registers the corresponding image as the cover image 724 of the album 910. Alternatively, a user can register a captured scene as the cover image 724 of the album 910 by clicking on a function button which automatically sets the captured scene as the cover image 724. After a user captures the desired scene during playback of a video file, the registering unit 440 automatically registers the captured scene as a cover image 724 of the album 910. Hence, the registering unit 440 includes a generating unit 445.

The generating unit 445 generates an image, also referred to as another image, using the scene captured by a user when a video file is played. The generated image is automatically registered as a cover image 724 of the album 910 via the registering unit 440, or moved by a user to the selected area 720 in order to be registered as a cover image 724 of the album 910 via the registering unit 440. According to an aspect of the present invention, the cover-image-managing apparatus 400 is connected to the auto-album-configuring apparatus 200. Alternatively, predetermined components in the cover-image-managing apparatus 400 may be included in the auto-album-configuring apparatus 200 to facilitate communication between the cover-image-managing apparatus 400 and the auto-album-configuring apparatus 200. It is understood that the cover-image-managing apparatus 400 may communicate with the auto-album-configuring apparatus 200 in various ways, such as via cable, wireless connection, etc.

Accordingly, the search unit 222 can extract the image to be used as the cover image 724 of an album 910 based on the information analyzed by the analyzing unit 410. For example, the search unit 222 extracts the image that was most frequently used by a user, and sets this image as the cover image 724 of an album 910 based on the analyzed information. Alternatively, the search unit 222 can extract a predetermined image as a cover image 724 of the album 910 according to a genre or mood that has the highest ratio of a selected genre or mood within the content 920 included in the album 910.

The term "unit", as used herein, refers to, but is not limited to referring to, a software or hardware component, such as a Field Programmable Gate Array (FPGA) or an Application Specific Integrated Circuit (ASIC), which performs certain tasks. A module may advantageously be configured to reside in the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Figure 5:
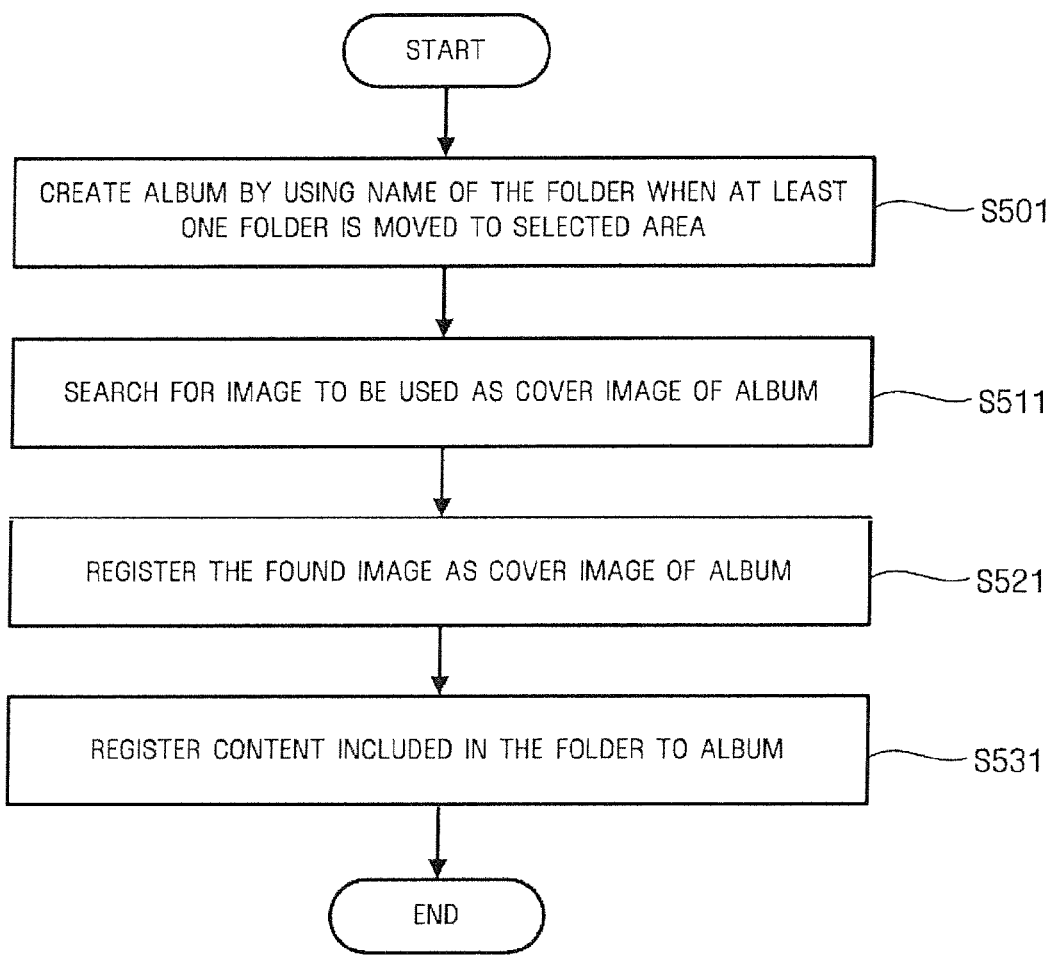
FIG. 5 is a flowchart showing an auto-album-configuring method according to an embodiment of the present invention.

FIG. 5 is a flowchart showing an auto-album-configuring method according to an embodiment of the present invention. In operation S501, the album-creating unit 210 creates an album 910 by using the folder name when at least one folder 712 is moved to the selected area 720. If several folders 712 are moved, several albums 910 are created according to the names of the moved folders 712.

At operation S511, the search unit 222 searches for an image to be used as a cover image 724 of the album 910. At this time, the search unit 222 may search for the image in a variety of ways, such as, for example, by using the folder name as a keyword to search metadata of the content 920 included in the folder 712, or by determining which image was most frequently used in the folder 712. If the setting unit 224 has been programmed to include a searching route, the search unit 222 searches for the image to be used as a cover image 724 of the album 910 by following the selected searching route. If the search unit 222 finds an image matching the keyword in the folder 712, the cover-image-registering unit 220 registers the image as the cover image 724 of the album 910. However, if the search unit 222 does not find an image matching the keyword in the folder 712, the search unit 222 may search various other locations for an image matching the metadata keyword, such as, for example, the Internet or other folders 712.

At operation S521, the cover-image-registering unit 220 registers the image as the cover image 724 of the album 910. At operation S531, the content-registering unit 230 registers content 920 included in the folder 712 to the album 910.

Figure 6:
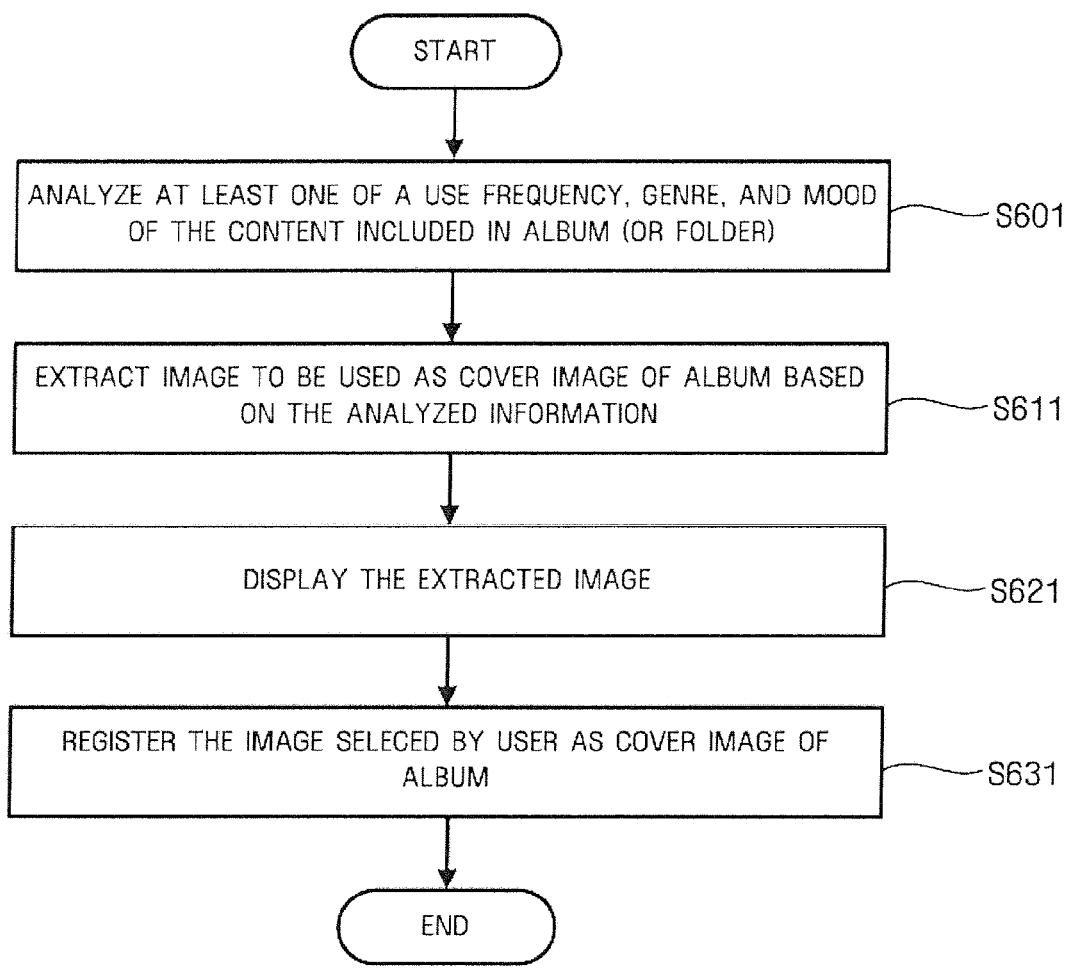
FIG. 6 is a flowchart showing a cover-image-managing method according to an embodiment of the present invention.

FIG. 6 is a flowchart showing a cover-image-managing method according to an embodiment of the present invention. At operation S601, the analyzing unit 410 analyzes at least one of a frequency of use, genre, or mood of the content 920 included in the album 910 (i.e., the content 920 included in the folder 712). It is understood that when the analyzing unit 410 analyzes at least one of frequency of use, genre, or mood, the analyzing unit 410 may analyze only one of frequency of use, genre, or mood, or may analyze a combination of these characteristics. It is further understood that the analyzing unit 410 is not limited to analyzing a frequency of use, a genre, or a mood of the content 920, and may instead analyze various other characteristics of the content 920, such as artist names or any other characteristics of the content 920 which can be described using metadata.

At operation S611, the extracting unit 420 extracts an image to be used as the cover image 724 of the album 910 based on the information analyzed by the analyzing unit. At operation S621, the display unit 430 displays the extracted image on a screen, such as an LCD screen of an MP3 player. At operation S631, the registering unit 440 registers the image selected by a user among the displayed images as the cover image 724 of the album 910. It is understood that only one image may be displayed at operation S631.

Figure 7:
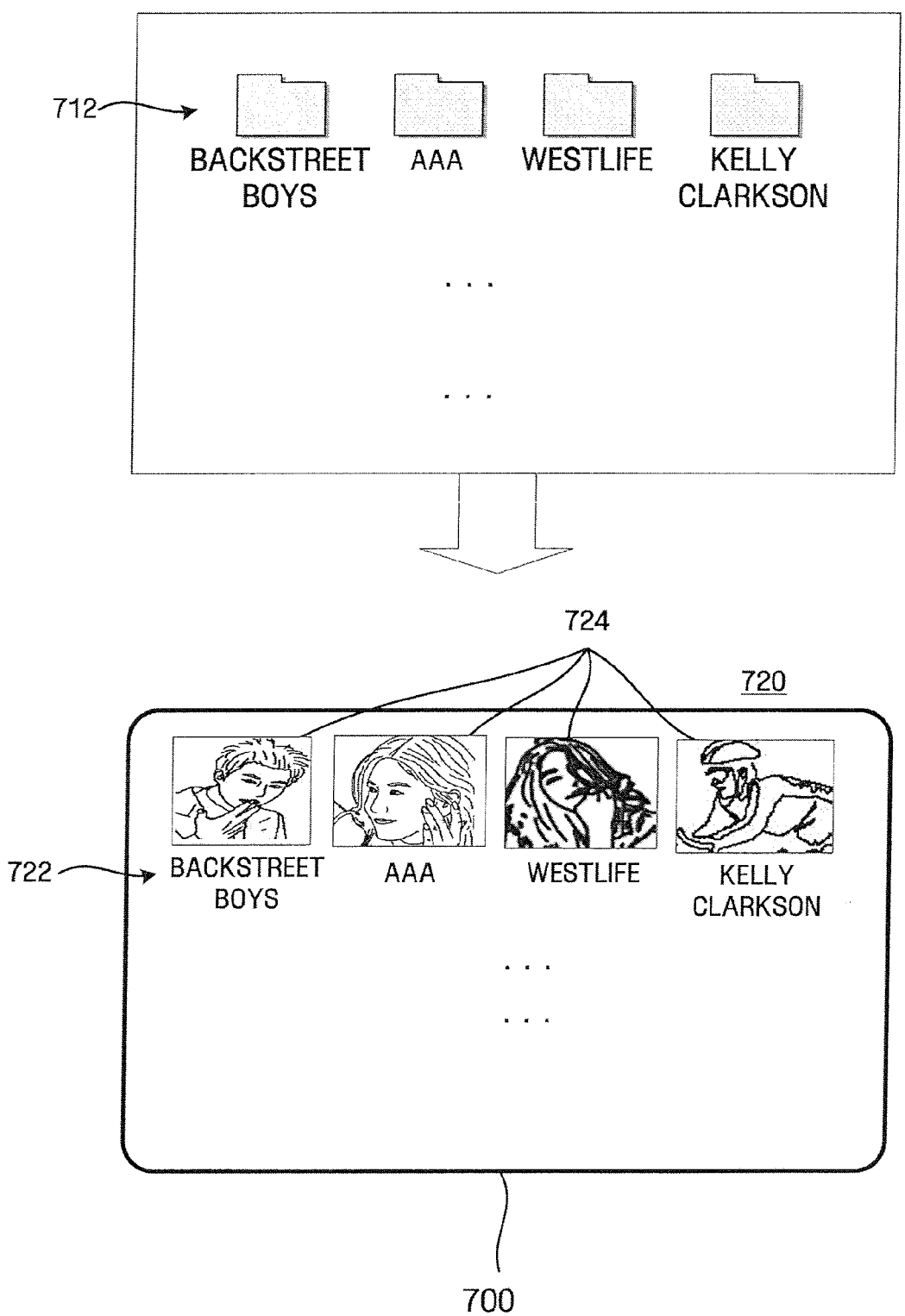
FIG. 7 depicts an auto-album-configuring screen according to an embodiment of the present invention.

FIG. 7 depicts an auto-album-configuring screen 700 according to an embodiment of the present invention. As shown in FIG. 7, when a user selects several folders 712 displayed on a screen in a device, such as, for example, an LCD screen on an MP3 player, and moves the folders 712 to the selected area 720 in the auto-album configuring screen 700, the auto-album configuring screen 700 automatically creates albums 910 based on the several folders 712. Specifically, the auto-album-configuring screen 700 automatically creates album names 722 according to the folder names of the several folders 712, and the cover-image-registering unit 220 automatically registers the cover images 724 of the corresponding albums 910. Furthermore, the auto-album configuring screen 700 creates the cover images 724 of the corresponding albums 910. For example, the cover images 724 of the albums 910 may be the images extracted from among the images in the corresponding folders 712 having metadata which match keywords, such as the respective folder names (i.e., the album name 722). Alternatively, the cover images 724 may be the images that were most frequently used by a user in the corresponding folder 712. Furthermore, the cover images 724 of the corresponding albums 910 may be images matching the keyword which are found on a designated Internet web site. After the auto-album configuring screen 700 generates the cover images 724, the content-registering unit 230 registers the content 920 included in each of the several folders 712

Figure 8:
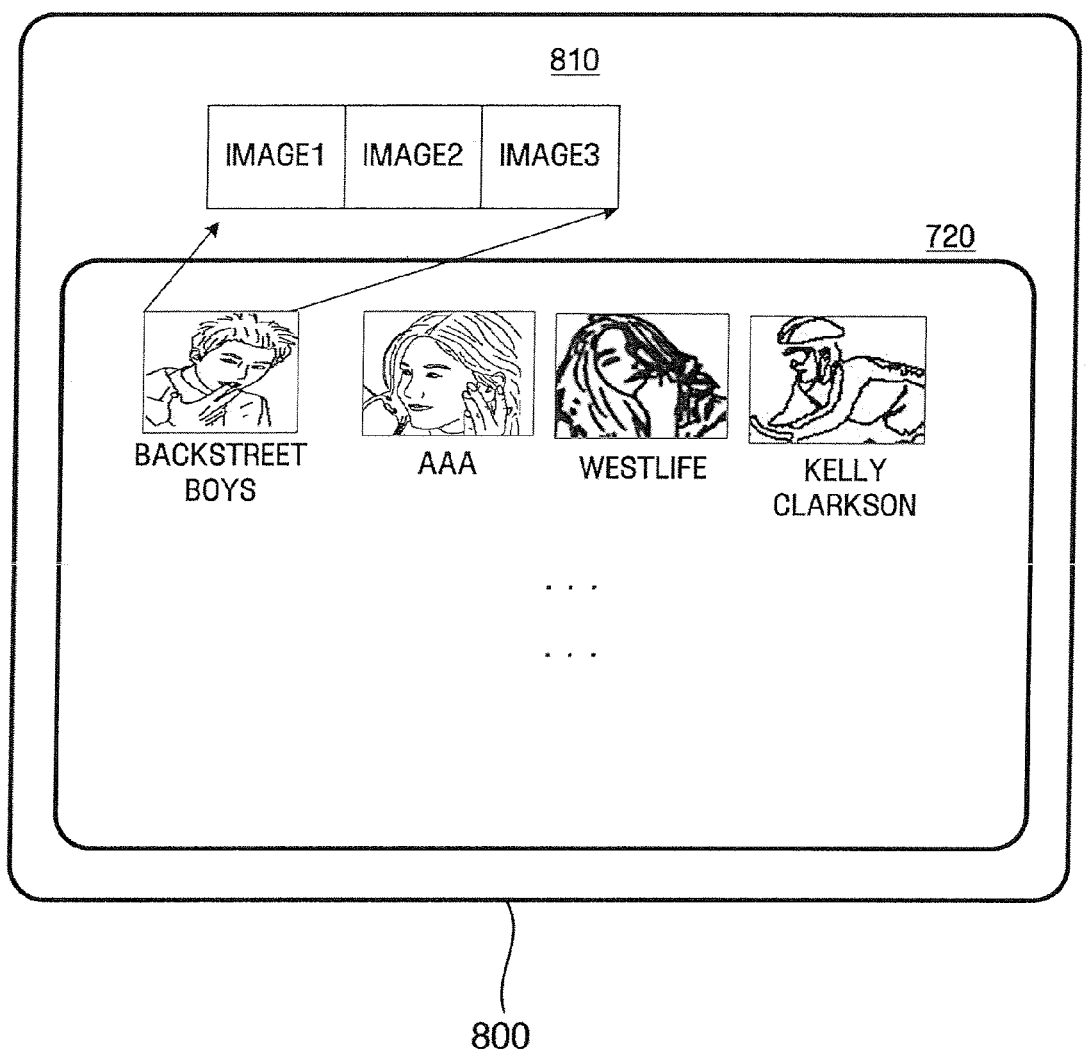
FIG. 8 depicts an image-recommending screen according to an embodiment of the present invention.

After the album configuration is completed, an image-recommending screen 800 shown in FIG. 8 recommends a plurality of images 810 to the user. Specifically, when a user controls a computer mouse to click a cover image 724 of an album 910, moves a cursor using arrow keys to select the cover image 724, or otherwise selects the cover image 724 using technologies known in the art in order to change a cover image 724 of the album 910, the image-recommending screen 800 recommends at least one image 810 out of a plurality of images 810 to the user as shown in FIG. 8. It is understood that when the image-recommending screen 800 recommends at least one image 810 out of a plurality of images 810, the recommending screen 800 may recommend only one image 810, or may recommend multiple images 810. The at least one image 810 out of the plurality of images 810 may be recommended to the user based on various criteria, such as, for example, images matching a specific frequency of use, a genre, or a mood of the content 920 included in the album 910. When a user selects at least one of the images 810 among the plurality of images 810, the cover-image-registering unit 220 registers the corresponding image 810 as the cover image 724 of the album 910.

Figure 9:
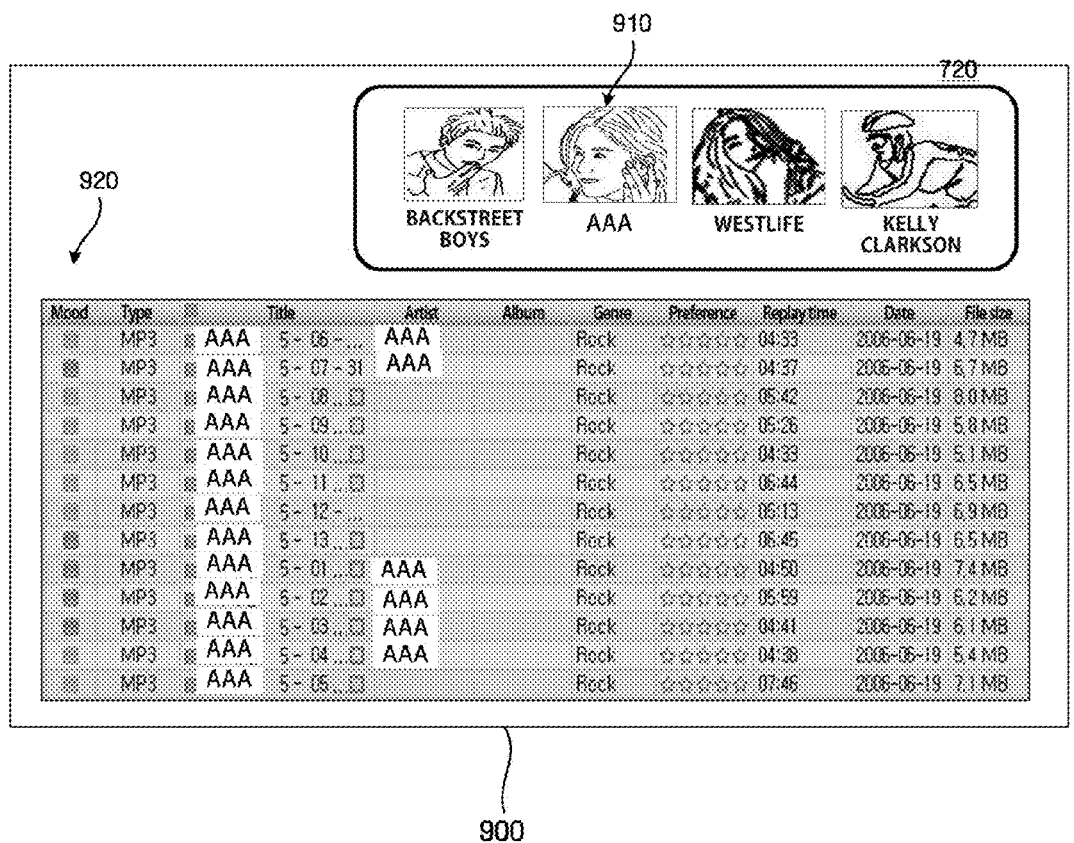
FIG. 9 depicts content included in an album according to an embodiment of the present invention.

FIG. 9 depicts content 920 in an album 910 according to an embodiment of the present invention. Both the cover images 724 of the albums 910 and information about the content 920 stored in the albums 910 is displayed on one content screen 900. When a user selects one of the cover images 724 of one of the albums 910, the content screen 900 displays the content 920 stored in the album 910. For example, if a user selects the cover image 724 corresponding to the album 910 labeled AAA, the content screen 900 displays the content 920 stored in the AAA album 910 for a user, and (s)he can select and play desired files within the displayed content 920. Also, a user can change a cover image 724 of one of the albums 910 by controlling a computer mouse to drag and drop a captured image, captured by a user from a video file during playback, on top of the original cover image 724 of the selected album 910.

As described above, the apparatus and method to automatically configure an album 910 and to manage a cover image 724 of the albums 910 according to aspects of the present invention achieves one or more of the following beneficial results. First, a user can easily configure a plurality of albums 910 by performing a simple action or a few simple actions, such as controlling a computer mouse to drag and drop a folder 712. Second, the cover-image registering unit 220 automatically registers a cover image 724 of an album 910, and enables a user to conveniently change cover images 724 of the album 910.

Various components of the auto-album-configuring apparatus 200, the cover-image-registering unit 220, the cover-image-managing apparatus 400, the auto-album-configuring screen 700, the image-recommending screen 800, and the content screen 900, as shown in FIGS. 2, 3, 4, 7, 8, and 9, respectively, such as the cover-image registering unit 220 and the content-registering unit 230 shown in FIG. 2, can be integrated into a single control unit, or alternatively, can be implemented in software or hardware, such as, for example, an application specific integrated circuit (ASIC). As such, it is intended that the processes described herein be broadly interpreted as being equivalently performed by software, hardware, or a combination thereof. Software modules can be written, via a variety of software languages, including C, C++, Java, Visual Basic, and many others. These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions of the software routines or modules may also be loaded or transported into the wireless cards or any computing devices on the wireless network in one of many different ways. For example, code segments including instructions stored on floppy discs, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

In addition, aspects of the present invention can also be embodied as computer readable codes on a computer readable recording medium. The computer readable recording medium is any data storage device that can store data which can be thereafter read by a computer system. Examples of the computer readable recording medium also include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While there have been illustrated and described what are considered to be example embodiments of the present invention, it will be understood by those skilled in the art and as technology develops that various changes and modifications may be made, and equivalents may be substituted for elements thereof without departing from the true scope of the present invention. Many modifications, permutations, additions and sub-combinations may be made to adapt the teachings of the present invention to a particular situation without departing from the scope thereof. Alternative embodiments of the invention can be implemented as a computer program product for use with a computer system. Such a computer program product can be, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device. Furthermore, the software modules as described can also be machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Accordingly, it is intended, therefore, that the present invention not be limited to the various example embodiments disclosed, but that the present invention includes all embodiments falling within the scope of the appended claims.

What is claimed is:

1. An auto-album-configuring apparatus comprising:
an album-creating unit to automatically create an album having a folder name of a folder when the folder having the folder name is moved to a selected area, the folder including a plurality of contents;
an analyzing unit to analyze the plurality of contents in the folder and to extract metadata related to the plurality of contents, the metadata including information on type, date, file size, genre, at least one image, and use frequency;
an extracting unit to retrieve one image to be used as a cover image of the album among the at least one image, based on at least one of the extracted metadata;
a display unit to display the album having the cover image on a screen;
a cover-image-registering unit to register an image among the at least one retrieved image as the cover image of the album; and
a content-registering unit to register contents included in the folder to the album,
wherein the extracting unit recommends at least one of the at least one image when a user selects the cover image of the album for changing the cover image after the album-creating unit creates the album, and
wherein the recommended images may be the image extracted based on at least one of the extracted metadata.

2. The apparatus of claim 1, wherein the cover-image-registering unit comprises a search unit to search for an image to be used as the cover image of the album.

3. The apparatus of claim 2, wherein the search unit searches for the image by using the folder name as a keyword.

4. The apparatus of claim 2, wherein the search unit determines that an image most frequently used in the folder is the image to be used as the cover image of the album, and extracts the image most frequently used in the folder to register the image as the cover image.

5. The apparatus of claim 2, wherein the search unit initially searches the folder for the image, and if the search unit does not find the image in the folder, the search unit searches the Internet for the image.

6. The apparatus of claim 1, wherein the user controls a computer mouse to move the folder into the selected area.

7. The apparatus of claim 1, wherein if the folder comprises sub-folders, the album-creating unit creates additional albums corresponding to the sub-folders, the cover-image-registering unit registers additional cover images of the additional albums, and the content-registering unit registers additional contents included in the sub-folders corresponding to the additional albums.

8. The apparatus of claim 1, wherein if one of the at least one extracted image is dragged and dropped by a computer mouse to the album, the cover-image-registering unit registers the image which has been dragged and dropped as the cover image of the album.

9. The apparatus of claim 1, further comprising:
a generating unit to generate another image using a scene captured by the user from a video file included in the plurality of contents.

10. The apparatus of claim 9, wherein the cover-image-registering unit automatically registers the other image as the cover image of the album.

11. The apparatus of claim 1, wherein a cover image of the album is changed by dragging and dropping the generated image, which was captured by the user while a moving picture is played, on a cover image of a predetermined album.

12. The apparatus of claim 1, wherein the extracting unit to retrieve one image to be used as a cover image of the album among at least one image in the created album, based on at least one of the extracted metadata.

13. The apparatus of claim 1, wherein an image that was most often used by the user in the corresponding folder may be registered as a cover image of the album.

14. An auto-album-configuring method comprising:
automatically creating an album having a folder name of a folder when the folder having the folder name is moved to a selected area, the folder including a plurality of contents;
analyzing contents in the folder and extracting metadata related to the plurality of contents, the metadata including information on type, date, file size, genre, at least one image, and use frequency;
retrieving at least one image to be used as a cover image of the album among the at least one image, based on at least one of the extracted metadata;
displaying the album having the cover image on a screen;
registering an image selected among the at least one retrieved image as the cover image of the album;
registering contents included in the folder to the album,
wherein at least one of the at least one image are recommended when a user selects the cover image of the album for changing the cover image after the album is created, and
wherein the recommended images may be the image extracted based on the extracted metadata.

15. The method of claim 14, further comprising:
searching for an image to be used as the cover image of the album.

16. The method of claim 15, wherein the searching includes searching for the image by using the folder name as a keyword.

17. The method of claim 15, wherein the searching comprises searching for an image that was most frequently used in the folder and extracting the image that was most frequently used to register the image that was most frequently used as the cover image of the album.

18. The method of claim 15, wherein the searching comprises:
initially searching the folder for the image; and
if the image is not found in the folder, searching the Internet for the image.

19. The method of claim 14, wherein the user controls a computer mouse to move the folder into the selected area.

20. The apparatus of claim 14, further comprising creating additional albums corresponding to sub-folders in the folder, registering additional cover images corresponding to the additional albums, and registering additional contents included in the sub-folders corresponding to the additional albums.

21. The method of claim 14, wherein the at least one extracted image is a predetermined sample image or an image taken from the Internet.

22. The method of claim 14, wherein the registering comprises registering one of the at least one extracted image which has been dragged and dropped by a computer mouse to the album as the cover image of the album.

23. The method of claim 14, further comprising:
generating another image using a scene captured by the user from a video file included in the plurality of contents when the video file is played.

24. The method of claim 14, wherein a cover image of the album is changed by dragging and dropping the generated image, which was captured by the user while a moving picture is played, on a cover image of a predetermined album.

25. The method of claim 14, wherein one image to be used as a cover image of the album is retrieved among at least one image in the created album, based on at least one of the extracted metadata.

26. The method of claim 14, wherein an image that was most often used by the user in the corresponding folder may be registered as a cover image of the album.

* * * * *